United States Patent [19]
Iritani

[11] Patent Number: 4,947,709
[45] Date of Patent: Aug. 14, 1990

[54] PROPELLER SHAFT TRANSMISSION STRUCTURE FOR A TRACTOR

[75] Inventor: Hirofumi Iritani, Sakai, Japan
[73] Assignee: Kubota, Ltd., Osaka, Japan
[21] Appl. No.: 267,013
[22] Filed: Nov. 4, 1988
[30] Foreign Application Priority Data Nov. 4, 1987 [JP] Japan ................................ 62-278803
Apr. 22, 1988 [JP] Japan ................................ 63-100535

[51] Int. Cl.$^5$ ............................................ F16H 35/00
[52] U.S. Cl. ...................................... 74/640; 180/337
[58] Field of Search .............. 74/640; 180/70.1, 900, 180/240; 192/70.12, 89 B

[56] References Cited
U.S. PATENT DOCUMENTS

| 2,240,317 | 4/1941 | Swenson | 180/70.1 X |
| 2,923,173 | 2/1960 | Hoffman | 180/70.1 X |
| 3,132,536 | 5/1964 | Sampietro | 180/70.1 X |
| 3,231,039 | 1/1966 | Saurer | 180/70.1 |
| 3,235,021 | 2/1966 | Hill | 180/70.1 X |
| 4,804,056 | 2/1989 | Toshikuni | 180/70.1 |
| 4,804,060 | 2/1989 | Iritani | 180/233 |

FOREIGN PATENT DOCUMENTS 61-110428  6/1986  Japan .
736353  9/1955  United Kingdom ............... 180/70.1

Primary Examiner—Dwight Diehl
Attorney, Agent, or Firm—Gifford, Groh, Sprinkle, Patmore and Anderson

[57] ABSTRACT

A drive transmission structure for a tractor comprising a propeller shaft extending between and interconnecting an output shaft of an engine disposed forwardly of a driver's section and an input shaft of a transmission disposed rearwardly of the driver's section. The engine is disposed at a rearwardly downward slant with the output shaft thereof extending toward the input shaft of the transmission. The transmission is disposed at a forwardly upward slant with the input shaft thereof extending toward the engine output shaft.

4 Claims, 3 Drawing Sheets

PROPELLER SHAFT TRANSMISSION STRUCTURE FOR A TRACTOR

BACKGROUND OF THE INVENTION

The present invention relates to a propeller shaft transmission structure for a tractor comprising an engine mounted forwardly of a driver's section and at a forward position of a main frame, a transmission case mounted rearwardly of the driver's section and at a rearward position of the main frame, and a propeller shaft interconnecting an engine output shaft extending rearwardly from the engine and a transmission input shaft extending forwardly from the transmission.

In a known transmission structure of the type noted above, the engine output shaft and the transmission input shaft are disposed at the same level, and the two shafts are interconnected by a propeller shaft extending horizontally, as disclosed in Japanese Utility Model Publication Kokai No. 61-110428. The tractor having such a transmission structure has a deck of the driver's section upwardly bulging along an intermediate position between right and left steps, and the propeller shaft extends through a housing defined by the bulging deck portion.

When driving the tractor having the above construction, the driver must place his feet across the bulging deck portion. The driver is thus compelled to take an uncomfortable driving posture.

With a view to allowing the driver to take a more comfortable driving posture, a proposal has been made to secure an increased foot space. In the proposed construction, as illustrated in FIG. 4, the transmission case is modified to dispose the input shaft at a lower level, and the propeller shaft 6 extends rearwardly and downwardly, whereby the the bulging deck portion between the steps is reduced in height.

According to the proposed construction, however, the transmission input shaft 9 is located at a much lower position than the engine output shaft 5, which results in an increased joint angle $\alpha$. This construction thus has the disadvantages of low transmission efficiency, increased noise and rapid wear.

SUMMARY OF THE INVENTION

The present invention has been made having regard to the state of the art noted above. The object of the invention, therefore, is to provide a transmission structure for effecting an efficient and smooth drive transmission from the engine output shaft to the transmission input shaft through the propeller shaft, while allowing the driver to take a comfortable driving posture.

The above object is achieved, according to the present invention, by a propelling shaft transmission structure for a tractor comprising an engine disposed forwardly of a driver's section and at a forward position of a main frame and including an engine output shaft extending rearwardly, a transmission disposed rearwardly of the driver's section and at a rearward position of the main frame and including a transmission input shaft extending forwardly, and a propeller shaft for operatively interconnecting the engine output shaft and the transmission input shaft, wherein the engine is disposed at a rearwardly downward slant with the engine output shaft extending toward the transmission input shaft while the transmission is disposed at a forwardly upward slant with the transmission input shaft extending toward the engine output shaft.

The function and advantage of this construction will be described with reference to FIG. 3. As seen, the engine E is disposed at a rearwardly downward slant with the engine output shaft 5 extending toward the transmission input shaft 9 while the transmission case M is disposed at a forwardly upward slant with the transmission input shaft 9 extending toward the engine output shaft 5. Thus the difference in level between the engine output shaft 5 and the transmission input shaft 9 is reduced without substantial vertical relocation of the engine E and the transmission case M. The joint angle $\beta$ is now reduced (preferably to zero).

Consequently, the propeller shaft extends rearwardly and downwardly to allow a foot support to be secured for the driver and to allow the driver to take a comfortable driving posture. At the same time the drive transmission is carried out smoothly and efficiently from the engine output shaft to the transmission input shaft through the propeller shaft without overstraining the joints and with low noise and slow wear.

In a preferred embodiment of the invention, an accelerating mechanism is provided forwardly of a main clutch disposed in an input region of the transmission. The accelerating mechanism includes an output member connected to an input member of the main clutch. The transmission input shaft is disposed below the input member of the main clutch.

According to this construction, the drive is transmitted from the engine output shaft through the propeller shaft to the transmission input shaft, and is then accelerated by the accelerating mechanism. Thereafter the drive is transmitted from the output member of the accelerating mechanism to the main clutch input member. Since the transmission input shaft is disposed below the main clutch input member, the propeller shaft interconnecting the engine output shaft and the transmission input shaft extends rearwardly and downwardly.

Consequently, the main clutch is operable with ease since the drive is accelerated and its torque reduced prior to transmission to the main clutch input member. This feature allows the main clutch to comprise a wet, multidisk type clutch more compact than in the prior art.

Furthermore, the propeller shaft extending rearwardly and downwardly enables a minimal bulge from the driver's deck. This feature allows for an enlarged space and increased comfort in the driver's section.

Other features and advantages of the present invention will be apparent from the following description.

BRIEF DESCRIPTION OF THE DRAWINGS

The drawings illustrate a propeller shaft transmission structure for a tractor according to the present invention, in which.

DESCRIPTION OF THE PREFERRED EMBODIMENT

An embodiment of the present invention will be described hereinafter with reference to the drawings.

Figure 1:
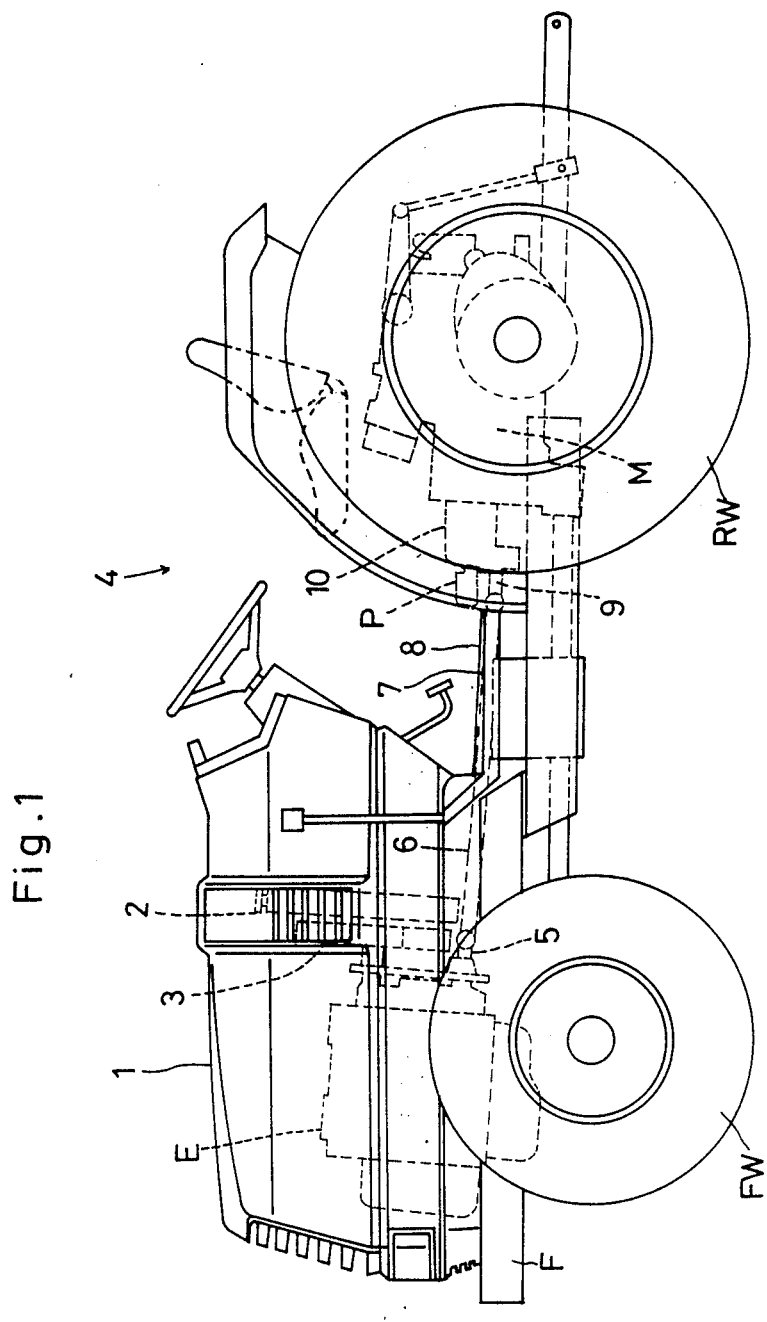
FIG. 1 is a side elevation of the tractor.

Referring to FIG. 1, a frame-type agricultural tractor is shown which comprises a main frame F supporting an engine E at a front position thereof and a transmission case M at a rear position. A driver's section 4 is provided between the engine E and transmission case M. These components are supported by right and left front wheels FW and right and left rear wheels RW.

The engine E is enclosed in a hood 1 with a radiator 2 and a cooling fan 3 disposed rearwardly of the engine E. The transmission case M is disposed rearwardly and downwardly of the driver's section 4. Drive from the engine E is output from an engine output shaft 5 and transmitted rearwardly through a propeller shaft 6 disposed under the driver's section.

The engine E is disposed at a rearwardly downward slant with the engine output shaft 5 extending toward a transmission input shaft 9, while the transmission case is disposed at a forwardly upward slant with the input shaft 9 extending toward the engine output shaft 5. This arrangement provides a reduced difference in level between the transmission input shaft 9 and the engine output shaft 5 and a minimal joint angle therebetween. Consequently, drive transmission from the engine E to the transmission case M is effected efficiently and with low noise and slow wear.

The propeller shaft 6 extends through a housing 8 extending longitudinally of the tractor and bulging upwardly between right and left steps 7 to the driver's section 4. The propeller shaft 6 extends rearwardly and downwardly with a rear end thereof connected to the transmission input shaft 9. The housing 8 bulges to the less extent rearwardly with the propeller shaft 6 reducing its height progressively rearwardly, to allow the driver's section to provide the larger space and more comfort.

Figure 2:
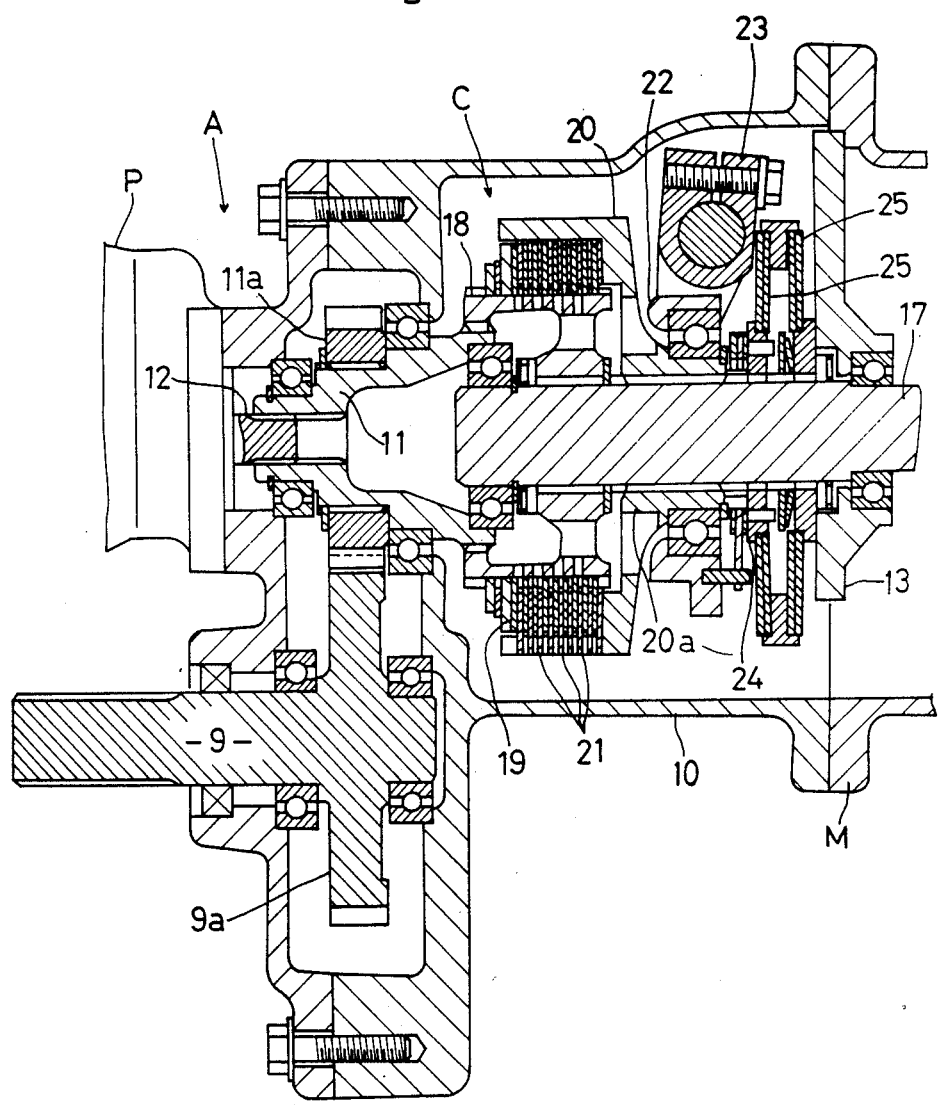
FIG. 2 is a side view in vertical section of an input region of a transmission.
Figure 3:
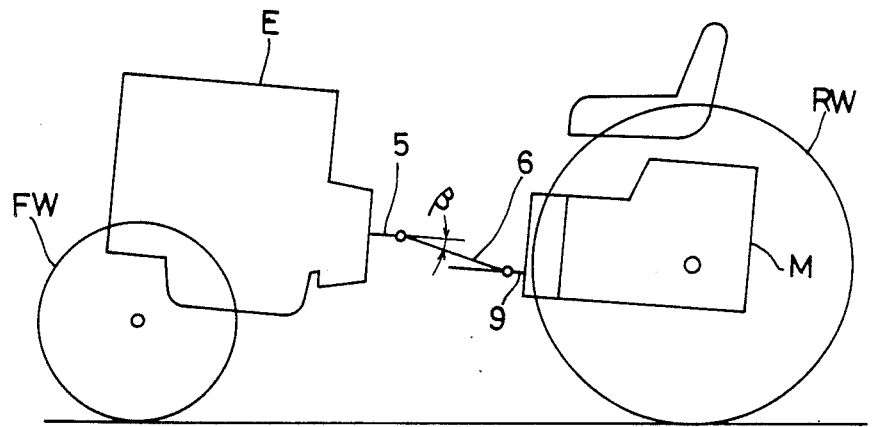
FIG. 3 is a schematic side view illustrating the present invention.
Figure 4:
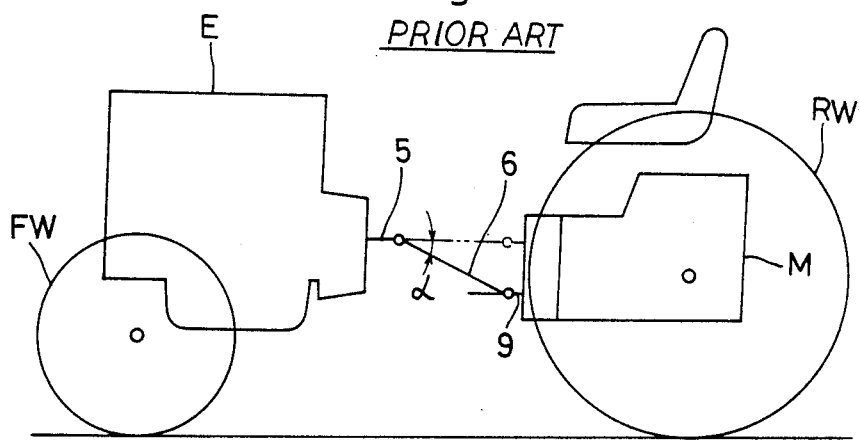
FIG. 4 is a schematic side view illustrating the prior art.

Referring to FIG. 2, a clutch case 10 containing a wet, multidisk type main clutch C is attached to an input region at the front of the transmission case M, and a hydraulic pump P is attached to the front of the clutch case 10. The clutch case 10 supports a cup-shaped main clutch input member 11 through bearings. The pump P has a drive shaft 12 splined to a forward end of the input member 11. The clutch case 10 further supports the transmission input shaft 9 below the input member 11, the input shaft 9 including a rear end gear 9a meshed with a gear 11a mounted peripherally of the input member 11. The gear 9a of the input shaft 9 has a larger diameter than the gear 11a of the input member 11, thereby to transmit the drive at an increased speed to the hydraulic pump P and the main clutch C. The rear end gear 9a of the input shaft 9 and the gear 11a peripherally of the input member 11 thus constitute an accelerating mechanism A.

Details of the main clutch C will be described next. A transmission shaft 17 extends between an opening of the input member 11 and a partition wall 13 disposed rearwardly of the clutch case 10. The transmission shaft 17 carries a clutch boss 18 mounted for relative rotation on a forward position thereof. The clutch boss 18 is splined at a forward end thereof to a rear end of the input member 11. The clutch boss 18 carries a plurality of drive friction disks 19 mounted peripherally thereof for unitary rotation therewith. The transmission shaft 17 further carries a clutch body 20 shiftably splined to an intermediate position thereof. The clutch body 20 contains a plurality of driven friction disks 21 fitted thereto for unitary rotatio therewith. The driven friction disks 21 are arranged alternately with the drive friction disks 19. The clutch body 20 defines a boss portion 20a supporting a clutch operating ring 22 through bearings. The ring 22 is peripherally engaged by a shift fork 23. The shift fork 23 is pivotable back and force to shift the clutch body 20 together with an oscillation member 24 for moving the driven friction disks 21 into and out of pressure contact with the drive friction disks 19.

According to this construction, the drive friction disks 19 and driven friction disks 21 are in pressure contact with one another under the forwardly urging force of a disk spring 25 when an operating force is not applied to the shift fork 23. In this state the main clutch C is engaged, with input member 11, clutch box 18, clutch body 20 and transmission shaft 17 rotating together. When the shift fork 23 is swung rearward to shift the clutch body 20 rearward against the urging force of the disk spring 25, the driven friction disks 21 are separated from the drive friction disks 19 to break power transmission from the clutch boss 18 to the clutch body 20, thereby disengaging the main clutch C.

What is claimed is:

1. A propelling power transmission system for a tractor comprising:

An engine disposed at a rearwardly downward slant forwardly of a driver's section and at a forward position of a main frame and including an engine output shaft extending rearwardly;

a transmission disposed at a rearwardly downward slant rearwardly of said driver's section and at a rearward position of said main frame and including a transmission input shaft extending forwardly in a lower region thereof, said transmission input shaft being positioned at a lower level than the engine output shaft;

a propeller shaft disposed at a rearwardly downward slant so as to operatively interconnect the transmission input shaft and the engine output shaft through bent joints;

a main clutch device provided in the transmission and including an input member positioned at a higher level than the transmission input shaft; and a gear transmission mechanism for transmitting the drive from the transmission input shaft to the clutch device.

2. A propelling drive transmission system as claimed in claim 1 wherein the main clutch device comprises a wet multidisk type clutch.

3. A propelling drive transmission system as claimed in claim 2 further comprising an oil pump driven by the input member of the main clutch device.

4. A propelling drive transmission system as claimed in claim 1 further comprising an oil pump driven by the input member of the main clutch device.

* * * * *